United States Patent
Lee et al.

(10) Patent No.: US 7,417,678 B2
(45) Date of Patent: Aug. 26, 2008

(54) PRECISE CMOS IMAGER TRANSFER FUNCTION CONTROL FOR EXPANDED DYNAMIC RANGE IMAGING USING VARIABLE-HEIGHT MULTIPLE RESET PULSES

(75) Inventors: Hae-Seung Lee, Bedford, MA (US); Keith Glen Fife, Stanford, CA (US); Lane G. Brooks, Watertown, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 901 days.

(21) Appl. No.: 10/751,562

(22) Filed: Jan. 5, 2004

(65) Prior Publication Data

US 2004/0174754 A1    Sep. 9, 2004

Related U.S. Application Data

(60) Provisional application No. 60/438,683, filed on Jan. 8, 2003.

(51) Int. Cl.
*H04N 3/14* (2006.01)
*H04N 5/335* (2006.01)
*H01L 27/00* (2006.01)

(52) U.S. Cl. ............... 348/308; 348/294; 348/310; 250/208.1

(58) Field of Classification Search ............ 348/294, 348/308, 310; 250/208.1
See application file for complete search history.

(56) References Cited

U.S. PATENT DOCUMENTS

| 6,040,570 | A  * | 3/2000 | Levine et al. ...... 250/208.1 |
| 6,348,681 | B1 * | 2/2002 | Kindt et al. ...... 250/208.1 |
| 6,441,852 | B1 * | 8/2002 | Levine et al. ...... 348/302 |
| 6,532,040 | B1   | 3/2003 | Kozlowski et al. |
| 2002/0043610 | A1 | 4/2002 | Lee et al. |
| 2003/0174226 | A1 * | 9/2003 | Ahn et al. ...... 348/294 |

\* cited by examiner

OTHER PUBLICATIONS

Decker et al., A 256×256 CMOS Imaging Array with Wide Dynamic Range Pixels and Column-Parallel Digital Output, IEEE Journal of Solid-State Circuits, vol. 33, No. 12, Dec. 1998, pp. 2081-2091.*

*Primary Examiner*—NgocYen T. Vu
*Assistant Examiner*—Chia-Wei A Chen
(74) *Attorney, Agent, or Firm*—Russell E. Baumann

(57) ABSTRACT

A sense node voltage relating to light intensity incident upon a light-detecting element is measured. To realize this measurement, a first integration reset pulse is generated to enable a resetting of the sense node voltage to a voltage value substantially equal to a reset voltage value associated with the first integration reset pulse, an edge of the first integration reset pulse triggering a beginning of a first integration period. Thereafter, a second integration reset pulse is generated to enable a resetting of the sense node voltage to a voltage value substantially equal to a reset voltage value associated with the second integration reset pulse, an edge of the second integration reset pulse triggering a beginning of a second integration period. Subsequent to the generation of the first integration reset pulse and prior to the generation of the second integration reset pulse, a plurality of intra-period reset pulses is generated to enable resetting of the sense node voltage to a plurality of voltage values, each voltage value being substantially equal to a reset voltage value associated with the generated intra-period reset pulse. The sense node voltage generated in response to incident light intensity is measured only once during an integration period, wherein this measurement takes place subsequent to the generation of the plurality of intra-period reset pulses and prior to the generation of the second integration reset pulse.

38 Claims, 4 Drawing Sheets

PRECISE CMOS IMAGER TRANSFER FUNCTION CONTROL FOR EXPANDED DYNAMIC RANGE IMAGING USING VARIABLE-HEIGHT MULTIPLE RESET PULSES

PRIORITY INFORMATION

This application claims priority under 35 U.S.C. § 119(e) from U.S. Provisional Patent Application, Ser. No. 60/438,683, filed on Jan. 8, 2003. The entire content of U.S. Provisional Patent Application, Ser. No. 60/438,683 is hereby incorporated by reference.

FIELD OF THE PRESENT INVENTION

The present invention relates to imaging devices and, in particular, to complementary metal-oxide semiconductor (CMOS) image sensors having expanded dynamic range imaging by using variable-height multiple reset pulses.

BACKGROUND OF THE PRESENT INVENTION

The present invention relates to CMOS imagers, and more particularly relates to techniques for increasing the dynamic range of a CMOS imager.

Conventionally, CMOS imagers are characterized by a linear voltage-to-light response, or transfer function; that is, the imager output voltage is approximately linearly related to light incident on the imager. Specifically, the output voltage transfer function is linearly proportional to the intensity of the light incident on the imager. This linear transfer function can be characterized by a dynamic range, given as the ratio of the highest detectable illumination intensity of the imager to the lowest detectable illumination intensity of the imager. It is well understood that the dynamic range of the transfer function sets the overall dynamic range of the imager. If the dynamic range of a scene exceeds the dynamic range of an imager, portions of the scene will saturate the imager and appear either completely black or completely white. This can be problematic for imaging large dynamic range scenes, such as outdoor scenes.

Conventionally, a CMOS imager pixel includes a phototransistor or photodiode as a light detecting element. In operation, e.g., the pixel photodiode is first reset with a reset voltage that places an electronic charge across the capacitance associated with the diode. Electronic charge produced by the photodiode when exposed to illumination then causes charge of the diode capacitance to dissipate in proportion to the incident illumination intensity. At the end of an exposure period, the change in diode capacitance charge is detected and the photodiode is reset. The amount of light detected by the photodiode is computed as the difference between the reset voltage and the voltage corresponding to the final capacitance charge. The illumination intensity that causes the photodiode capacitance charge to be completely dissipated prior to the end of the exposure period, thereby saturating the pixel, sets the upper end of the pixel dynamic range, while thermally generated photodiode charge and other noise factors set the lower end of the pixel dynamic range.

Referring to FIG. 1, the operation of a prior art pixel 10 is described, FIG. 1 providing a schematic diagram of the pixel. This example pixel configuration employs a photodiode. In the current example, a photodiode 11 of the pixel produces a current of photogenerated electrical charge in response to light incident on the pixel. The resulting photocurrent is directed to a charge-sensing capacitor 13. The charge-sensing capacitor 13 is in practice provided as a collection of parasitic capacitances that are associated with a charge sense node 27 of the photodiode.

A MOS transistor 15 operates as a source follower that buffers the voltage on the capacitor 13 nondestructively to a column line 23 for read out of the voltage. Specifically, a row select MOS switch 17 activates the source follower transistor 15 when the particular row is selected to thereby enable the capacitor voltage measurement. When the row select MOS switch 17 of the row is turned ON, and a current source 25 is connected to the source of the MOS transistor 15, the MOS transistor 15 and the current source 25 operate as a source-follower configuration to buffer the voltage on the photodiode capacitor 13 to the column line 23 for determining the capacitor voltage at the end of an exposure period.

FIG. 3 shows a typical reset voltage waveform $V_R(t)$ applied to the gate 21 of the reset transistor 19 and the voltage waveform $V_P(t)$ at the sense node 27. For simplicity of discussion, the steady-state gate-to-source voltage of the reset transistor 19 is assumed to be zero when turned ON although in practice this voltage is non-zero. The reset voltage $V_R(t)$ is raised to a voltage $V_{RESET}$ for a duration of time referred to as reset period, indicated as $T_R$ in FIG. 3. During this reset period, the reset transistor 19 resets the voltage $V_P(t)$ at the sense node 27 to $V_{RESET}$.

As explained previously, the actual voltage that the sense node is reset to is a few hundred millivolts below $V_{RESET}$ due to the non-zero gate-to-source voltage of reset transistor 19. When the reset voltage is lowered at the end of the reset period, the reset transistor 19 turns OFF. The photo-generated current $I_P$, proportional to the incident light intensity, is now integrated on the sense capacitor, lowering the sense node voltage linearly with time assuming the light intensity is constant. The period of time between the end of the reset period $T_1$ and the time $T_2$ when the sense node voltage is measured, typically just before the beginning of the next reset period, is referred to as integration period $T_{IN}$. The extent of the sense node voltage change $V_{OUT}$ during the integration period change is a measure of the incident light intensity, and therefore measured as an output voltage of the pixel. It can be shown $$V_{OUT} = \frac{I_P T_{IN}}{C_S}$$

where $C_S$ is the value of the sense capacitor 13. Since the photocurrent $I_P$ is proportional to the incident light intensity, the output voltage $V_{OUT}$ is proportional to the incident light intensity.

The maximum output voltage is limited because the sense node voltage cannot drop below ground by more than a few hundred millivolts because the photodiode is forward biased. Typically, the maximum output voltage that can be measured is limited by the subsequent signal processing circuits such as the correlated double sampling (CDS) circuit and the A/D converter. This maximum measurable output voltage is indicated as $V_{MAX}$ in FIG. 3.

The illumination intensity that causes the output voltage to reach $V_{MAX}$ at the end of the integration period, thereby saturating the measured pixel output voltage, sets the upper end of the pixel dynamic range, while thermally generated photodiode charge and other noise factors set the lower end of the pixel dynamic range.

A variety of techniques have been proposed for expanding the dynamic range of a CMOS imager.

One technique uses double exposures, where two successive frames of the image are taken, one with a long exposure followed by at another with shorter exposure time as illustrated in FIG. 4 where typical reset voltage waveform $V_R(t)$ applied to the gate 21 of the reset transistor 19 and the voltage waveform $V_P(t)$ at the sense node 27 are shown. As before, for simplicity of discussion, the steady-state gate-to-source voltage of the reset transistor 19 is assumed to be zero when turned ON although in practice this voltage is non-zero. The pixel is reset during the first reset period $T_{R1}$ and integrated for the first integration period $T_{IN1}$, producing a first output voltage $V_{OUT1}$. This output voltage is sampled and stored in a sample-and hold circuit or converted into a digital value and stored in digital registers.

The pixel is reset again during the second reset period $T_{R2}$ and integrated for the second integration period $T_{IN2}$, producing a second output voltage $V_{OUT2}$. This second output voltage is sampled and stored in a sample-and hold circuit or converted into a digital value and stored in digital registers. The outputs $V_{OUT1}$ and $V_{OUT2}$ are added with appropriate scaling factor.

Since $V_{OUT1}$ is obtained with a long integration time $T_{IN1}$, details in the dark areas are captured. However, the bright areas will saturate as shown in the dotted line, $V_{P2}(t)$, and details in these areas are lost. Since $V_{OUT2}$ is obtained with a short integration time $T_{IN2}$, the bright areas do not saturate, but the dark areas do not produce enough response so that the details are not visible.

When the results of the two outputs are added, details in both the dark and bright areas are visible, effectively increasing the dynamic range of the captured image. This technique can be extended to multiple exposures. The disadvantage of the double or multiple exposure method is the complexity resulting from the circuits required to perform additions of pixel outputs from multiple exposure times. Analog addition and digital addition techniques are described in prior art.

As a simple example, assuming the outputs are added in the analog domain with the following formula, $$V_{OUT}=0.9(V_{OUT1}V_{OUT2})$$

and also assuming $$T_{IN1}=9T_{IN2},$$

the illumination intensity versus the output voltage relation in FIG. 5 is obtained. The dotted line extension of the first segment indicates the output of a conventional pixel with a single integration time.

$$T_{IN}=T_{IN1}+T_{IN2}$$

It is clear from FIG. 5 that the double integration method produces a piecewise linear characteristic which compresses the pixel output voltage in the bright illumination, and extends the dynamic range. In the conventional method, the output saturates at the illumination intensity of $I_1$, while in the double integration method, the output saturates at the illumination intensity of 9.9 $I_1$, roughly a factor of 10 improvement in dynamic range.

However, both analog and digital addition techniques significantly increase the complexity of the imager. There are variations of the double and multiple integration method that uses a single reset. This method involves sampling the output of a pixel at multiple times after a single reset. Similar increase of the dynamic range is obtained, with similar disadvantages to the double and multiple integration techniques described above.

In another technique to increase the dynamic range, the voltage-to-light transfer function of the imager is modified to be a nonlinear function of illumination intensity, with transfer function slope increasing linearly as a function of illumination intensity. This transfer function modification is typically implemented as a photodiode capacitance charge control function within a CMOS imager pixel.

Specifically, in this technique, over the course of an exposure period a control voltage is applied to the photodiode to control charge capacity of the sense capacitance. The charge control voltage is typically decreased from the starting pixel reset voltage value to, e.g., electrical ground, with each control voltage value at a given time during the exposure period setting the maximum charge dissipation of the photodiode. This control voltage decrease acts to increase the photodiode charge dissipation capability, whereby the pixel can accommodate a higher illumination intensity before saturating, and the dynamic range of the pixel is thusly increased. This charge dissipation control overrides the conventional linear voltage-to-charge transfer function of the pixel to produce a nonlinear transfer function, generally referred to as a compressed transfer function, and a correspondingly expanded dynamic range of the pixel and the imager.

Theoretically, the charge dissipation control voltage applied to a pixel photodiode is preferably continuously adjusted over the course of an exposure period. This enables the production of almost any desired transfer function compression characteristic. For many applications, this theoretical condition is not practical, however.

Conventional CMOS imagers include an array of pixel columns and rows and typically do not include pixel memory. Therefore, at the end of an exposure period each row of pixel values must be immediately read out. But in general, only one row of pixel values can be read out at a time.

To accommodate this condition, the exposure periods of the pixel rows are typically staggered in a time sequence corresponding to the sequential pixel row read out. As a result, the desired pixel charge control voltage waveform must also be applied to the pixel rows in a staggered sequence; the same control voltage waveform is applied to every pixel row but is staggered in time between rows.

As a practical matter, given, e.g., a conventional VGA imager including 480 pixel rows, it would be difficult to deliver 480 continuous-time control voltage waveforms to the imager array or to generate 480 delayed versions of a single continuous-time waveform. It has been found that the approximation of a continuous-time control voltage waveform by a discrete-time, or stepped, control voltage waveform addresses this timing concern while enabling more flexibility and ease in control voltage generation and sequential delivery to a pixel array. In this technique, a desired continuous-time control voltage waveform, or transfer function compression curve, is approximated by voltage steps. This results in a finite number, e.g., eight, of distinct control voltage levels to be applied in a discrete manner to a pixel over the course of that pixel's exposure period as shown in FIG. 2.

One of the disadvantages of this technique is that the control voltage levels are applied continuously during the exposure period. Conventionally, the prescribed discrete-time analog control voltages are generated off-chip from the imager array and the barrier voltages must not have any positive glitches then delivered to each pixel row on-chip in a staggered sequence controlled by, e.g., a digital controller. It has been found that this scenario enables good pixel control as well as timing control and additionally provides the ability to modify the transfer function compression characteristic. It has been recognized that the discrete analog voltages produced to impose imager transfer function control preferably are regulated to be precise and noise free, and preferably are maintained free of glitches, where a "glitch" is here defined as a rapid excursion, or spike, in the voltage. Without such regulation, the desired compression function could be distorted, with the resulting images including noise or appearing unnatural. Regulation of the control voltages is particularly important as the voltages are switched from one pixel row to the next. Specifically, when a given control voltage is applied from one pixel row to the next, a voltage excursion, or glitch, is produced due to an inherent row switching capacitance. Such an excursion in a voltage source could cause rows of pixels already connected to that voltage to dissipate charge or accumulate charge in a manner not consistent with the desired transfer function. Since the control voltages determine the charge capacity of pixels at any time, the control voltages must be maintained glitch-free; i.e., the control voltages must be generated in such way the glitches do not affect the charge capacity.

Another disadvantage of this technique is the fact that the effective charge capacity is not constant even when the control voltage is kept constant. During the integration phase, the maximum current through the reset transistor on whose gate the control voltage is applied is the photo current. Since the photocurrent is typically on the order of 1 pA or less, the gate-to-source voltage can change only slowly with time. If a pixel is very bright, the pixel voltage hits the barrier voltage sooner, causing the pixel voltage to go down lower compared with the less bright pixel whose pixel voltage hits the barrier at a later time. In other words, the compression characteristic is not static function, and hence becomes a complex function of the control voltage waveforn, pixel capacitance, and photo current, among other tings. Therefore, the compression characteristic becomes difficult to control precisely. The first barrier level in relation to the reset level, which determines the first inflection point of the compression curve, can be most severely affected because the duration of the reset period is typically different from the duration of any barrier level.

SUMMARY OF THE PRESENT INVENTION

A first aspect of the present invention is a method for measuring a sense node voltage associated with a light-detecting element, the sense node voltage being related to light intensity incident upon the light-detecting element. The method generates a first integration reset pulse to enable a resetting of the sense node voltage to a voltage value substantially equal to a reset voltage value associated with the first integration reset pulse, an edge of the first integration reset pulse triggering a beginning of a first integration period; generates a second integration reset pulse to enable a resetting of the sense node voltage to a voltage value substantially equal to a reset voltage value associated with the second integration reset pulse, an edge of the second integration reset pulse triggering a beginning of a second integration period; generates, subsequent to the generation of the first integration reset pulse and prior to the generation of the second integration reset pulse, a plurality of intra-period reset pulses to enable resetting of the sense node voltage to a plurality of voltage values, each voltage value being substantially equal to a reset voltage value associated with the generated intra-period reset pulse; and measures, only once during an integration period, the sense node voltage generated in response to incident light intensity, the sense node voltage being measured subsequent to the generation of the plurality of intra-period reset pulses and prior to the generation of the second integration reset pulse.

A second aspect of the present invention is a method for measuring a sense node voltage associated with a light-detecting element, the sense node voltage being related to light intensity incident upon the light-detecting element. The method initiates an integration period for the light-detecting element; resets, a plurality of times, the voltage level of the sense node after initiating the integration period; and measures, only once during the integration period, the sense node voltage generated in response to incident light intensity, the sense node voltage being measured subsequent to the plural resettings of the voltage level of the sense node and prior to initiating a next integration period.

A third aspect of the present invention is a method for capturing a frame of image data associated with a scene using an array of light-detecting elements, each light-detecting element having an associated sense node. The method initiates an integration period for the array of light-detecting elements, the integration period being associated with the frame of image data; generates a plurality of intra-period reset pulses during the integration period such that voltage levels of the sense nodes associated with a portion of the array of light-detecting elements are enabled to be set a plurality of times during the integration period; and measures, only once during the integration period, the voltage levels of the sense nodes voltages generated in response to incident light intensities, the sense node voltages being measured subsequent to a final resetting of the voltage levels of the sense nodes associated with the portion of the array of light-detecting elements and prior to initiating a next integration period.

A fourth aspect of the present invention is a method for measuring a sense node voltage associated with a light detecting element, the sense node voltage being related to light intensity incident upon the light detecting element. The method initiates an integration period for the light-detecting element; resets, a first number of times during the integration period, the voltage level of the sense node after initiating the integration period; and measures the sense node voltage generated in response to incident light intensity, the sense node voltage being measured a second number of times during the integration period, the second number of times being less than the first number of times.

A fifth aspect of the present invention is a method for measuring a sense node voltage associated with a light-detecting element, the sense node voltage being related to light intensity incident upon the light-detecting element, the light-detecting element having a reset switch associated therewith so as to set a voltage level of the sense node. The method generates a first integration reset pulse to enable a resetting of the sense node voltage to a voltage value substantially equal to a reset voltage value associated with the first integration reset pulse, an edge of the first integration reset pulse triggering a beginning of a first integration period; generates a second integration reset pulse to enable a resetting of the sense node voltage to a voltage value substantially equal to a reset voltage value associated with the second integration reset pulse, an edge of the second integration reset pulse triggering a beginning of a second integration period; generates, subsequent to the generation of the first integration reset pulse and prior to the generation of the second integration reset pulse, a train of progressively decreasing intra-period reset pulses to enable resetting of the sense node voltage to a plurality of voltage values, each voltage value being substantially equal to a reset voltage value associated with the generated intra-period reset pulse; and measures, only once during an integration period, the sense node voltage generated in response to incident light intensity, the sense node voltage being measured subsequent to the generation of the train of progressively decreasing reset pulses and prior to the generation of the second integration reset pulse.

A sixth aspect of the present invention is a method for measuring a sense node voltage associated with a light-detecting element, the sense node voltage being related to light intensity incident upon the light-detecting element. The method generates a first integration reset pulse to enable a resetting of the sense node voltage to a voltage value substantially equal to a reset voltage value associated with the first integration reset pulse, an edge of the first integration reset pulse triggering a beginning of a first integration period; generates a second integration reset pulse to enable a resetting of the sense node voltage to a voltage value substantially equal to a reset voltage value associated with the second integration reset pulse, an edge of the second integration reset pulse triggering a beginning of a second integration period; generates, subsequent to the generation of the first integration reset pulse and prior to the generation of the second integration reset pulse, a plurality of intra-period reset pulses to selectively reset the sense node voltage to a plurality of voltage values, each voltage value being substantially equal to a reset voltage value associated with the generated intra-period reset pulse; and measures, only once during an integration period, the sense node voltage generated in response to incident light intensity, the sense node voltage being measured subsequent to the generation of the plurality of intra-period reset pulses and prior to the generation of the second integration reset pulse.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE PRESENT INVENTION

Figure 1:
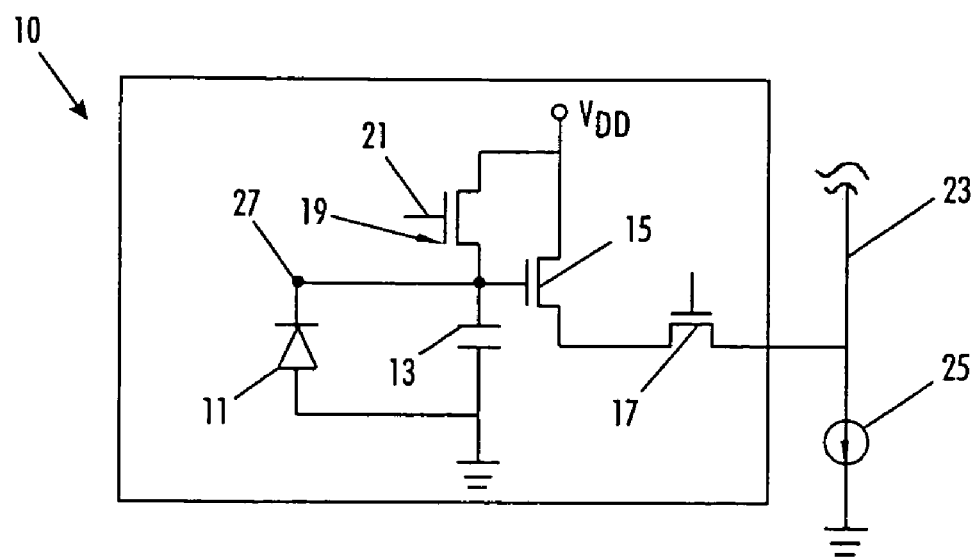
FIG. 1 is a schematic diagram of a pixel provided in accordance with the present invention for enabling expanded imager dynamic range.

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions have been purposely drawn disproportionately so that the features and concepts of the present invention could be properly illustrated.

Again referring to FIG. 1, the operation of a pixel 10 provided by the present invention for enabling expanded dynamic range by application of stepped charge control voltages is described. This example pixel configuration employs a photodiode 11, but it is to be recognized that in general, the pixel can include other light collecting configurations, embodied as, e.g., a phototransistor, a photogate, or other selected configuration. In the current example, a photodiode 11 of the pixel 10 produces a current of photogenerated electrical charge in response to light incident on the pixel 10. The resulting photocurrent is directed to a charge-sensing capacitor 13. The charge-sensing capacitor 13 is in practice provided as a collection of parasitic capacitances that are associated with a charge sense node 27 of the photodiode 11.

A MOS transistor 15 operates as a source follower that buffers the voltage on the capacitor 13 nondestructively to a column line 23 for read out of the voltage. Specifically, a row select MOS switch 17 activates the source follower transistor 15 when the particular row is selected to thereby enable the capacitor voltage measurement. When the row select MOS switch 17 of the row is turned ON, and a current source 25 is connected to the source of the MOS transistor 15, the MOS transistor 15 and the current source 25 operate as a source-follower configuration to buffer the voltage on the photodiode capacitor 13 to the column line 23 for determining the capacitor voltage at the end of an exposure period.

Figure 2:
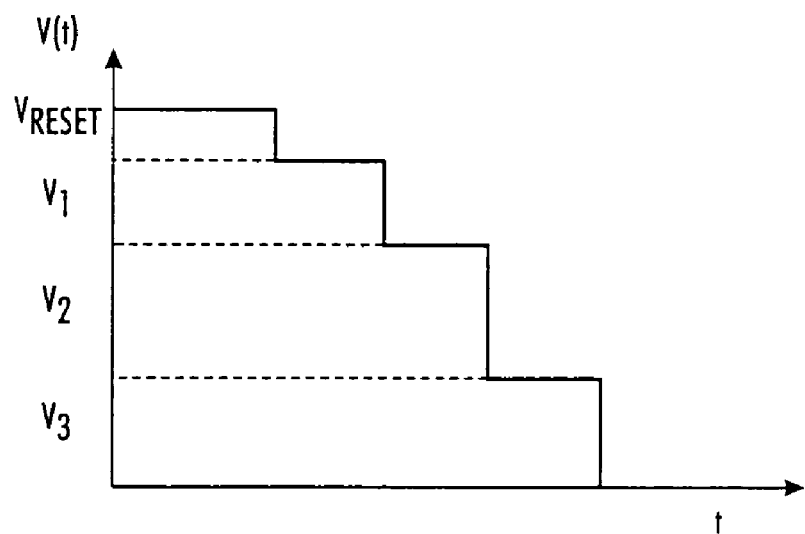
FIG. 2 is a plot of an example discrete-time charge control voltage profile, as a function of time, as provided by the present invention.
Figure 3:
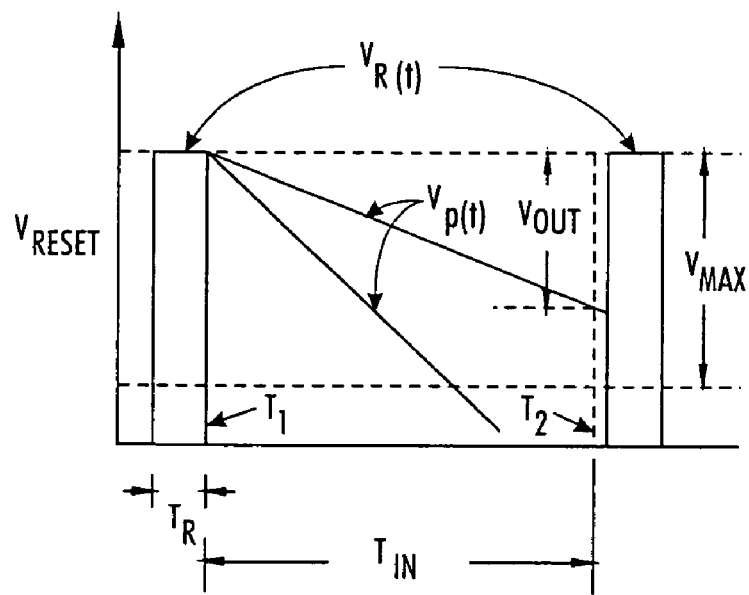
FIG. 3 is a plot of the reset and the pixel voltage waveform, as provided by the present invention.
Figure 4:
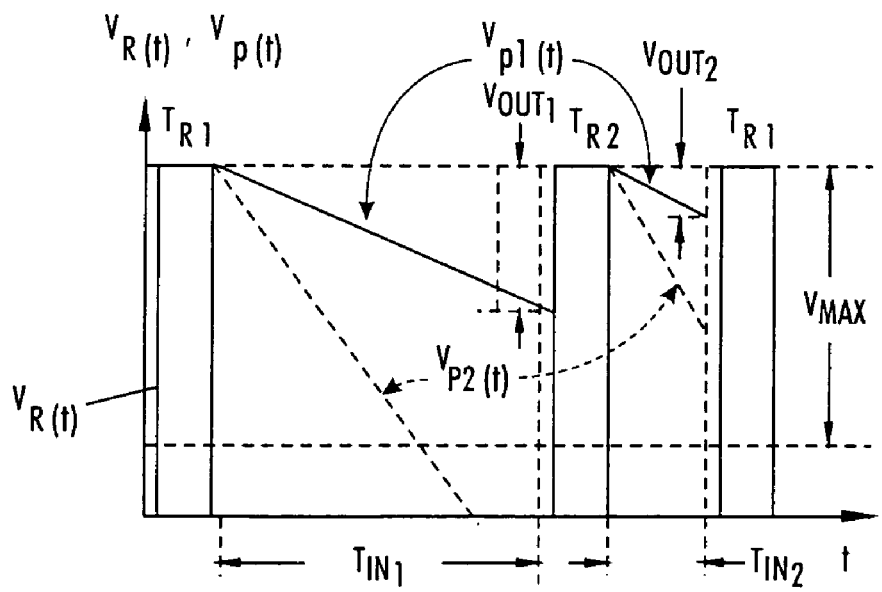
FIG. 4 is a plot of the reset and the pixel voltage waveform in accordance with prior art double reset method.
Figure 5:
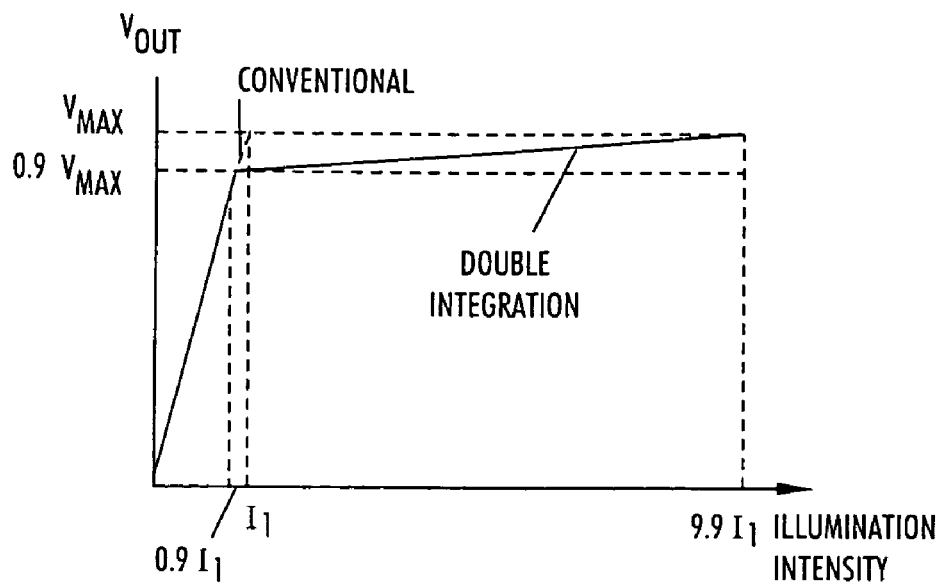
FIG. 5 is a plot of output voltage versus illumination characteristic provided by the prior art double reset method.

Referring also to FIG. 2, a stepped, i.e., discrete-time, charge control voltage profile, V(t), is applied to the gate 21 of a reset transistor 19 of the pixel over the course of an exposure period for control of the charge dissipation from the photodiode capacitance. The gate 21 of the reset transistor 19 thereby operates as a reset node for delivering charge control voltages to the pixel photodiode. While this reset node is shown in this example as a MOS transistor gate, it is to be recognized that other reset node configurations can be accommodated by the control technique of the present invention. For clarity of discussion, in the plot of FIG. 2 only three different control voltage step values, $V_1$, $V_2$, $V_3$, are shown along with the pixel reset voltage, $V_{RESET}$, but it is to be recognized that additional voltage levels can be provided as prescribed by a desired transfer function compression characteristic.

Figure 6:
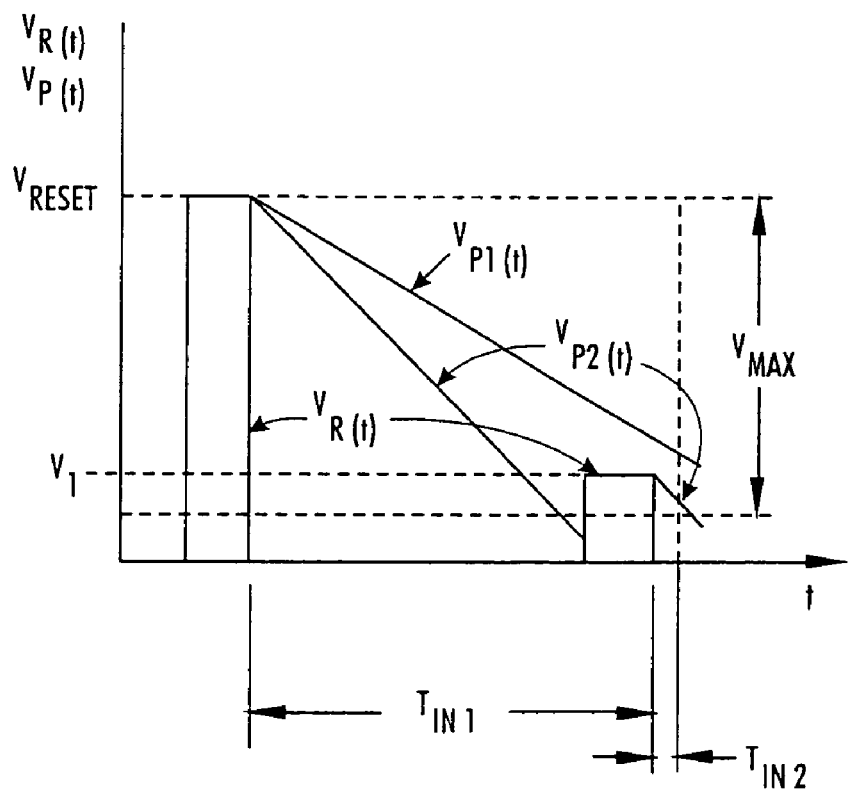
FIG. 6 is an example of the reset and the pixel voltage waveforms in accordance with the concepts of the present invention.

According to the concepts of the present invention, as illustrated in FIG. 6, double reset pulses $V_R(t)$ are applied to the gate 21 of the reset transistor 19 in a manner similar to the prior art double reset method. In the present invention, however, the second reset pulse has a lower height than the first reset such that it rises only to $V_1$ instead of $V_{RESET}$. This performs conditional reset of the pixel depending on the pixel voltage just prior to the application of the second reset. Since the reset transistor 19 can only source current but cannot sink current, the pixel is not affected if its voltage just prior to the application of the second reset is higher than $V_1$. This is indicated as $V_{P1}(t)$. On the other hand, if voltage just prior to the application of the second reset is lower than $V_1$, as indicated for $V_{P2}(t)$, the pixel voltage is reset to $V_1$.

As an example, consider the case where $V_{RESET}-V_1=0.9V_{MAX}$, and $T_{IN1}=9T_{IN2}$, where $V_{MAX}$ maximum measurable output as before. Note that no addition of the outputs is necessary in contrast to the double reset method described in the previous section.

Figure 7:
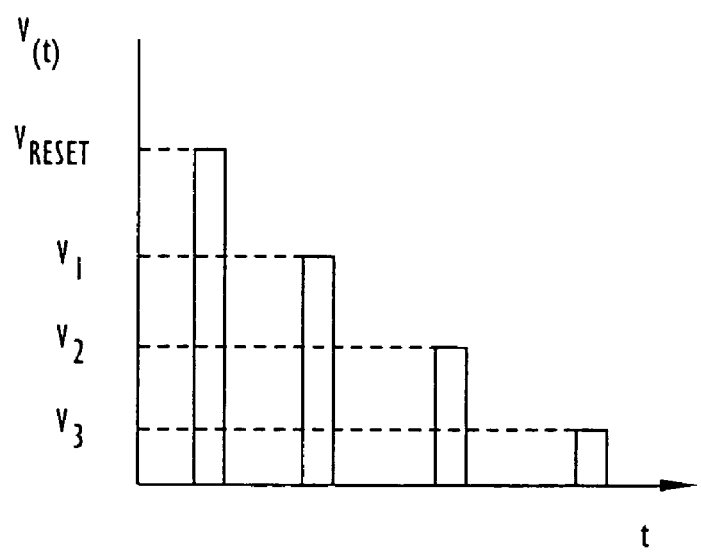
FIG. 7 is another example of the reset waveforms in accordance with the concepts of the present invention.

The method can be easily extended to multiple reset pulses in order to provide an arbitrary output versus illumination characteristic in a monotonically increasing piecewise linear fashion. Referring also to FIG. 7, a multiple reset pulses, $V_R$ (t), is applied to the gate 21 of a reset transistor 19 of the pixel over the course of an exposure period. The spacing between the reset pulses and the height of individual reset pulses determine the compression characteristic. The height of the reset pulses get progressively lower over the course of an integration period. It is also noted that the train of progressively decreasing intra-period reset pulses can progressively decrease in pulse width. While this reset node is shown in this example as a MOS transistor gate, it is to be recognized that other reset node configurations can be accommodated by the control technique of the present invention.

For clarity of discussion, in the plot of FIG. 7 only four reset pulses, with heights $V_{RESET}$, $V_1$, $V_2$, and $V_3$, but it is to be recognized that additional reset pulses can be provided as prescribed by a desired transfer function compression characteristic. Unlike in the prior art multiple reset method, the output is captured only once at the integration period per frame. This simplifies the signal processing circuit greatly, eliminating the need for the capture and storage of multiple output values.

There are a number of advantages of the present invention compared with prior art. Compared with the prior art multiple reset method, the present invention does not require addition of outputs nor does it require the capture and storage of multiple output values, making the system much simpler. In comparison to the prior art charge capacity control (stepped barrier compression) method in which accurate barrier voltages must be maintained for duration of the step, the present invention employs short reset pulses. For this reason, the reset level is required to be accurate only for a short duration. For this reason, the present invention exhibit more tolerance to glitches in reset level voltages compared with stepped barrier method's tolerance to the glitches in the barrier levels. In addition, the compression characteristic can be more precisely controlled because the period of the reset pulses is constant.

Figure 8:
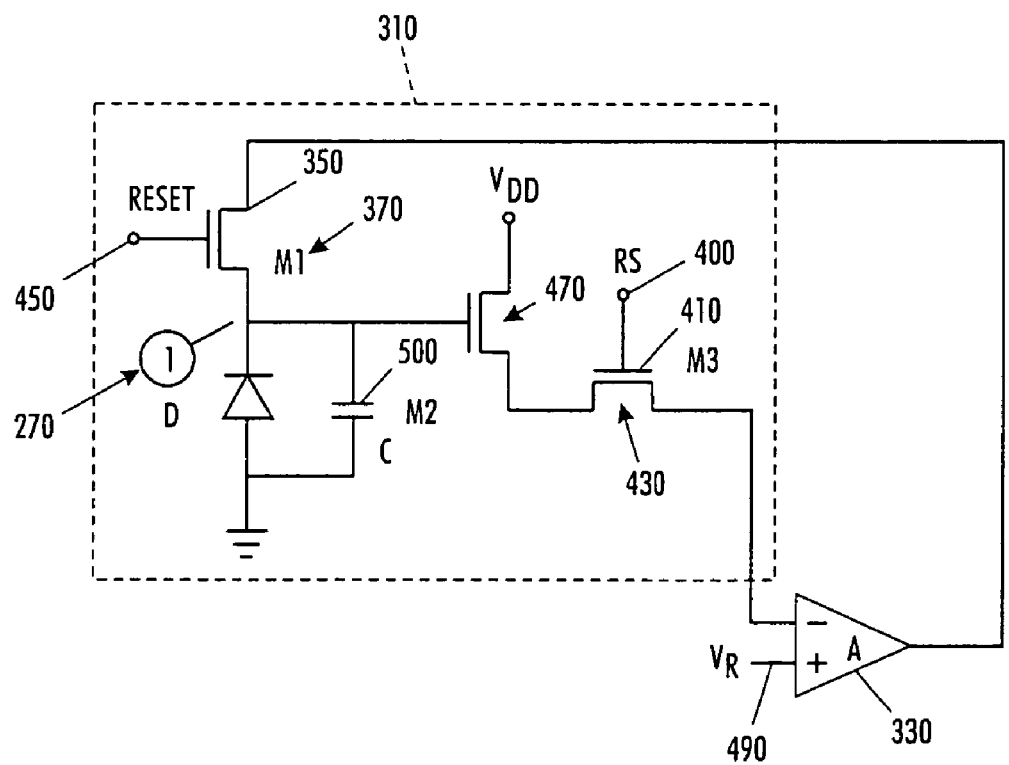
FIG. 8 is a schematic of a low noise reset circuit waveforms in accordance with the concepts of the present invention.

The present invention is particularly advantageous when used in conjunction with a low noise reset circuit, as illustrated in FIG. 8.

FIG. 8 shows a pixel 310 and an amplifier 330. Amplifier 330 may, for example, be a differential amplifier. The dashed line represents the pixel 310. The structure of the pixel 310 is substantially identical to the pixel illustrated in FIG. 1, except the first terminal 350, the drain of reset transistor 370, is connected to the output of the amplifier 330 instead of $V_{DD}$. The second terminal of reset transistor 370 is the source and is the same as NODE1 270. The first and second terminal's 350 and 270 being designated as a drain or source may be interchange depending on the transistor type and design.

During the reset phase, the select signal RS 400 (in this case a row select signal) on the gate for 410 of row select transistor 430 is brought high typically to $V_{DD}$, and a reset voltage $V_{RESET}$, typically $V_{DD}$, is applied to RESET 450. In the loop consisting of the amplifier 330, reset transistor 370, and source-follower transistor 470 and row select transistor 430 is a unity gain loop.

The voltage $V_R$ applied to the non-inverting input 490 of the amplifier 330 is determine such that NODE1 270 is servoed to a voltage $V_T-\Delta V$ below the reset voltage by the negative feedback loop, the output of amplifier 330 to the drain 350 of the reset transistor 370. $\Delta V$ is on the order of a few hundred millivolts in order to keep the reset transistor 370 in the subthreshold region in the steady-state of the reset phase. It can be shown that the required $V_R=V_{RESET}(V_T-\Delta V)+V_{GS2}+V_{DS3}$, where $V_{GS2}$ is the gate to source voltage for the source-follower transistor 470 and be $V_{DS3}$ is the drain to source voltage for the row select transistor 430.

A more detailed description of a low noise reset circuit is provided in co-pending U.S. patent application, entitled "CMOS Active Pixel with Reset Noise Reduction," U.S. patent application Ser. No. 10/067,554, filed Feb. 4, 2002. The entire content of U.S. patent application Ser. No. 10/067, 554 is hereby incorporated by reference.

As noted above and in incorporated co-pending U.S. patent application Ser. No. 10/067,554, a low noise reset circuit is capable of resetting any pixel to a desired reset voltage precisely with much less reset noise compared with conventional reset methods. The pixels can be reset to different reset levels (e.g. $V_{RESET}$, $V_1$, $V_2$, and $V_3$,) by a single low-noise reset circuit per column (or per row if so arranged) of the imaging array. Since the each reset level lasts only for a short period of time, the low-noise reset circuit can be time-multiplexed among all pixels in a column (or in a row), so the complexity of the imager is not significantly increased. In addition to lower noise, the present invention, in combination with a low noise reset circuit, can provide much more precise control of the compression function of the imager. This is because the effect of the time and photo current dependence of the gate-to-source voltage of the reset transistor 19 is eliminated by the feedback provided by the low noise reset circuit.

Whatever circuit implementation is selected for generating the charge control voltage levels, it is preferred in accordance with the present invention that the voltage generation circuit be fabricated monolithically, on-chip with the imager array. The substrate on which the imaging array and voltage generation circuitry are integrated can be provided as a silicon or other semiconductor substrate. Preferably, the substrate is compatible with CMOS fabrication processes, which can be preferred for producing a MOS imager and corresponding electronics. The resistors of the voltage generation circuitry preferably are fabricated as polysilicon resistors, produced by the MOS fabrication process. Monolithic integration of the voltage generation circuit is also advantageous in that such enables efficient monolithic integration of the digital voltage switching control circuitry described above. The present invention therefore contemplates that for most applications, monolithic single-chip integration of an imager array with the voltage generation circuitry and switching circuitry is preferred.

The present invention contemplates that monolithic integration of the imager array and voltage generation circuitry can optionally include monolithically-integrated bypass capacitors, if desired for a particular application, but such is not required, given the voltage spike control technique of the present invention described above. It is a common practice to utilize unused areas of a chip for on-chip bypass capacitors for various circuit voltages that are desired to stay quiet. The present invention does not inhibit following such conventional practice to bypass on-chip control voltages with on-chip capacitors. If such is carried out, however, caution must be exercised. While the addition of the on-chip bypass capacitors generally reduces the magnitude of glitches, such capacitors increase the RC time constant of the decay of glitches. Thus, to meet the requirements of the present invention, the Thevenin resistance of the voltage generation circuitry must be made correspondingly smaller, following the considerations given above.

Fundamentally, as explained above, the present invention does not require bypass capacitors and can most advantageously be employed by eliminating bypass capacitors. The voltage spikes, or glitches, associated with sequential charge control voltage application to pixel rows of an imager are controlled to substantially completely decay during the characteristic pixel array row access time. This control ensures that any glitches appearing in the control voltage waveforms will have no effect on pixel readout data. In accordance with the present invention, this eliminates the need for large bypass capacitors for removing glitches in the conventional manner, and thereby enables monolithic integration of the voltage generation circuitry in a manner that was conventionally understood to not be feasible.

The present invention provides the ability to effectively implement a compressive CMOS imager transfer function, to expand imager dynamic range, in a manner that effectuates precise control over the imager transfer function by employing variable height multiple reset pulses. The present invention avoids complicated analog or digital addition, and is much more tolerant to control voltage glitches, thereby allowing the usage of simpler control voltage generation.

While various examples and embodiments of the present invention have been shown and described, it will be appreciated by those skilled in the art that the spirit and scope of the present invention are not limited to the specific description and drawings herein, but extend to various modifications and changes.

What is claimed is:

1. A method for measuring a sense node voltage associated with a light-detecting element, the sense node voltage being related to light intensity incident upon the light-detecting element, comprising:
   (a) generating a first integration reset pulse to enable a resetting of the sense node voltage to a voltage value substantially equal to a reset voltage value associated with the first integration reset pulse, an edge of the first integration reset pulse triggering a beginning of a first integration period;
   (b) generating a second integration reset pulse to enable a resetting of the sense node voltage to a voltage value substantially equal to a reset voltage value associated with the second integration reset pulse, an edge of the second integration reset pulse triggering a beginning of a second integration period;
   (c) generating, subsequent to the generation of the first integration reset pulse and prior to the generation of the second integration reset pulse, a plurality of intra-period reset pulses to enable resetting of the sense node voltage to a plurality of voltage values, each voltage value being substantially equal to a reset voltage value associated with the generated intra-period reset pulse, the intra-period reset pulses progressively decreasing in pulse width; and
   (d) measuring, only once during an integration period, the sense node voltage generated in response to incident light intensity, the sense node voltage being measured subsequent to the generation of the plurality of intra-period reset pulses and prior to the generation of the second integration reset pulse.

2. The method as claimed in claim 1, wherein the reset voltage values associated with the plurality of intra-period reset pulses are less than the reset voltage value associated with the first integration reset pulse.

3. The method as claimed in claim 2, wherein the reset voltage value associated with one of the plurality of intra-period reset pulses is less than the reset voltage value associated with a previous one of the plurality of intra-period reset pulses.

4. The method as claimed in claim 1, wherein the generation of the plurality of intra-period reset pulses is non-periodic.

5. The method as claimed in claim 2, wherein the generation of the plurality of intra-period reset pulses is non-periodic.

6. The method as claimed in claim 3, wherein the generation of the plurality of intra-period reset pulses is non-periodic.

7. The method as claimed in claim 1, wherein the generation of the plurality of intra-period reset pulses is periodic.

8. The method as claimed in claim 2, wherein the generation of the plurality of intra-period reset pulses is periodic.

9. The method as claimed in claim 3, wherein the generation of the plurality of intra-period reset pulses is periodic.

10. The method as claimed in claim 1, further comprising:
    (e) resetting a voltage level of the sense node when the voltage level of the sense node is less than the voltage value associated with the generated intra-period reset pulse.

11. A method for measuring a sense node voltage associated with a light detecting element, the sense node voltage being related to light intensity incident upon the light detecting element, comprising:
    (a) initiating an integration period for the light-detecting element;
    (b) resetting, using a plurality of intra-period reset pulses, a plurality of times, the voltage level of the sense node after initiating the integration period, the intra-period reset pulses progressively decreasing in pulse width; and
    (c) measuring, only once during the integration period, the sense node voltage generated in response to incident light intensity, the sense node voltage being measured subsequent to the plural resettings of the voltage level of the sense node and prior to initiating a next integration period.

12. The method as claimed in claim 11, wherein the voltage levels associated with the plural resettings of the voltage level of the sense node have voltage values less than a voltage value used to reset the voltage level of the sense node at a beginning of the integration period.

13. The method as claimed in claim 11, wherein a voltage level associated with one of the plural resettings during the integration period is less than a voltage level associated with a previous one of the plural resettings during the integration period.

14. The method as claimed in claim 11, wherein the plural resettings generate a non-periodic pattern.

15. The method as claimed in claim 11, wherein the plural resettings generate a periodic pattern.

16. A method for capturing a frame of image data associated with a scene using an array of light-detecting elements, each light-detecting element having an associated sense node, comprising:
    (a) initiating an integration period for the array of light-detecting elements, the integration period being associated with the frame of image data;
    (b) generating a plurality of intra-period reset pulses during the integration period such that voltage levels of the sense nodes associated with a portion of the array of light-detecting elements are enabled to be set a plurality of times during the integration period, the intra-period reset pulses progressively decreasing in pulse width; and
    (c) measuring, only once during the integration period, the voltage levels of the sense nodes voltages generated in response to incident light intensities, the sense node voltages being measured subsequent to a final resetting of the voltage levels of the sense nodes associated with the portion of the array of light-detecting elements and prior to initiating a next integration period.

17. The method as claimed in claim 16, wherein the voltage levels associated with the plurality of intra-period reset pulses have voltage values less than a voltage value used to reset the voltage levels of all the sense nodes at a beginning of the integration period.

18. The method as claimed in claim 16, wherein a voltage level associated with the plurality of intra-period reset pulses during the integration period is less than a voltage level associated with a previous one of the plurality of reset pulses during the integration period.

19. The method as claimed in claim 16, wherein the voltages levels associated with the plurality of intra-period reset pulses during the integration period progressively decrease during the integration period.

20. The method as claimed in claim 16, further comprising:
  (d) resetting a voltage level of the sense node when the voltage level of the sense node is less than the voltage value associated with the generated reset pulse.

21. A method for measuring a sense node voltage associated with a light detecting element, the sense node voltage being related to light intensity incident upon the light detecting element, comprising:
  (a) initiating an integration period for the light-detecting element;
  (b) resetting, a first number of times during the integration period, using a number of intra-period reset pulses, the number of intra-period reset pulses being equal to the first number of times, the voltage level of the sense node after initiating the integration period, the intra-period reset pulses progressively decreasing in pulse width; and
  (c) measuring the sense node voltage generated in response to incident light intensity, the sense node voltage being measured a second number of times during the integration period, the second number of times being less than the first number of times.

22. The method as claimed in claim 21, wherein the voltage level associated with resetting of the voltage level of the sense node has a voltage value less than a voltage value used to reset the voltage level of the sense node at a beginning of the integration period.

23. The method as claimed in claim 21, wherein the first number of times is greater than one and wherein a voltage level associated with one of the plural resettings during the integration period is less than a voltage level associated with a previous one of the plural resettings during the integration period.

24. A method for measuring a sense node voltage associated with a light-detecting element, the sense node voltage being related to light intensity incident upon the light-detecting element, the light-detecting element having a reset switch associated therewith so as to set a voltage level of the sense node, comprising:
  (a) generating a first integration reset pulse to enable a resetting of the sense node voltage to a voltage value substantially equal to a reset voltage value associated with the first integration reset pulse, an edge of the first integration reset pulse triggering a beginning of a first integration period;
  (b) generating a second integration reset pulse to enable a resetting of the sense node voltage to a voltage value substantially equal to a reset voltage value associated with the second integration reset pulse, an edge of the second integration reset pulse triggering a beginning of a second integration period;
  (c) generating, subsequent to the generation of the first integration reset pulse and prior to the generation of the second integration reset pulse, a train of progressively decreasing intra-period reset pulses to enable resetting of the sense node voltage to a plurality of voltage values, each voltage value being substantially equal to a reset voltage value associated with the generated intra-period reset pulse; and
  (d) measuring, only once during an integration period, the sense node voltage generated in response to incident light intensity, the sense node voltage being measured subsequent to the generation of the train of progressively decreasing intra-period reset pulses and prior to the generation of the second integration reset pulse, the train of progressively decreasing intra-period reset pulses progressively decreasing in pulse width.

25. The method as claimed in claim 24, wherein the train of progressively decreasing intra-period reset pulses progressively decreases in voltage level.

26. The method as claimed in claim 24, wherein the train of progressively decreasing intra-period reset pulses represents a non-periodic pattern.

27. The method as claimed in claim 24, wherein the train of progressively decreasing intra-period reset pulses represents a periodic pattern.

28. The method as claimed in claim 24, further comprising:
  (e) resetting a voltage level of the sense node when the voltage level of the sense node is less than the voltage value associated with the generated intra-period reset pulse.

29. A method for measuring a sense node voltage associated with a light-detecting element, the sense node voltage being related to light intensity incident upon the light-detecting element, comprising:
  (a) generating a first integration reset pulse to enable a resetting of the sense node voltage to a voltage value substantially equal to a reset voltage value associated with the first integration reset pulse, an edge of the first integration reset pulse triggering a beginning of a first integration period;
  (b) generating a second integration reset pulse to enable a resetting of the sense node voltage to a voltage value substantially equal to a reset voltage value associated with the second integration reset pulse, an edge of the second integration reset pulse triggering a beginning of a second integration period;
  (c) generating, subsequent to the generation of the first integration reset pulse and prior to the generation of the second integration reset pulse, a plurality of intra-period reset pulses to selectively reset the sense node voltage to a plurality of voltage values, each voltage value being substantially equal to a reset voltage value associated with the generated intra-period reset pulse, the intra-period reset pulses progressively decreasing in pulse width; and
  (d) measuring, only once during an integration period, the sense node voltage generated in response to incident light intensity, the sense node voltage being measured subsequent to the generation of the plurality of intra-period reset pulses and prior to the generation of the second integration reset pulse.

30. The method as claimed in claim 29, wherein the reset voltage values associated with the plurality of intra-period reset pulses are less than the reset voltage value associated with the first integration reset pulse.

31. The method as claimed in claim 30, wherein the reset voltage value associated with one of the plurality of intra-period reset pulses is less than the reset voltage value associated with a previous one of the plurality of intra-period reset pulses.

32. The method as claimed in claim 29, wherein the generation of the plurality of intra-period reset pulses is non-periodic.

33. The method as claimed in claim 30, wherein the generation of the plurality of intra-period reset pulses is non-periodic.

34. The method as claimed in claim 31, wherein the generation of the plurality of intra-period reset pulses is non-periodic.

35. The method as claimed in claim 29, wherein the generation of the plurality of intra-period reset pulses is periodic.

36. The method as claimed in claim 30, wherein the generation of the plurality of intra-period reset pulses is periodic.

37. The method as claimed in claim 31, wherein the generation of the plurality of intra-period reset pulses is periodic.

38. The method as claimed in claim 29, wherein the voltage level of the sense node is reset when the voltage level of the sense node is less than the voltage value associated with the generated intra-period reset pulse.

* * * * *